March 8, 1960     O. D. FLINT     2,927,555
POULTRY NESTING ASSEMBLY
Filed June 30, 1958
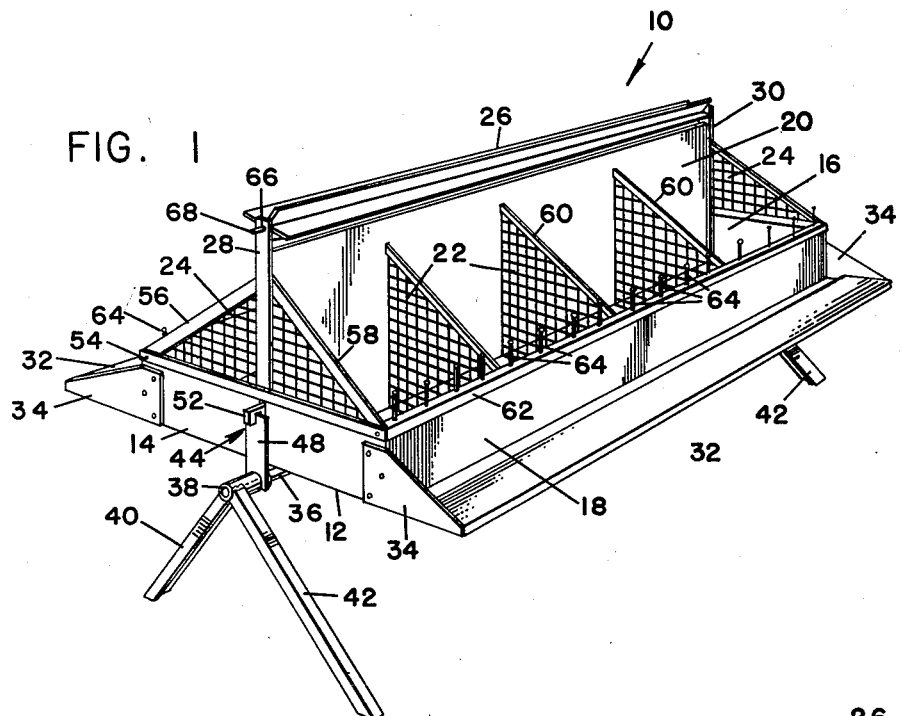
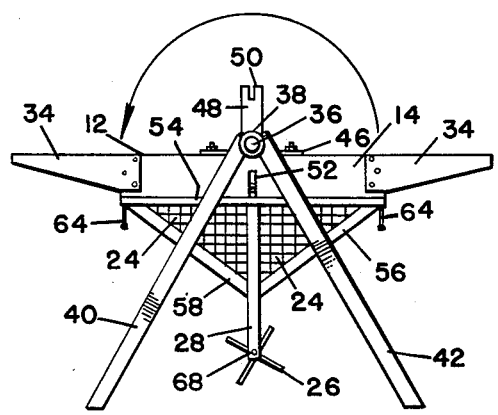
FIG. 2
INVENTOR.
O. D. FLINT
BY

United States Patent Office 2,927,555
Patented Mar. 8, 1960

2,927,555

POULTRY NESTING ASSEMBLY

Ole D. Flint, Viborg, S. Dak.

Application June 30, 1958, Serial No. 745,436

3 Claims. (Cl. 119—45)

This invention relates to poultry, and particularly nests of the open type where hens are free to lay eggs and return to pens and the like, and in particular a pivotally mounted nest assembly or platform with nests separated by wire mesh partitions on both sides of a center wall wherein the complete assembly may be inverted for cleaning and wherein a spinner and other means are provided for preventing chickens roosting on the assembly and dropping litter in the nests so that the complete nest assembly remains clean, and wherein straw of the nests is readily removed and replaced.

The purpose of this invention is to provide an improved nest assembly that is open and that remains clean and fresh continuously.

Poultrymen are becoming more conscious of the value of cleanliness from year to year, and the importance of clean nests for laying hens is generally realized. The disadvantage of poultry roosting on nests with droppings being deposited in the nests is appreciated. With these thoughts in mind this invention contemplates a nest assembly constructed on a platform with spaced wire mesh partitions extended from a center wall and with upper edges of the partitions inclined to prevent poultry stopping thereon, and in which the platform is pivotally mounted and provided with a spinner for preventing poultry roosting above the center wall thereof.

The object of this invention is, therefore, to provide a nest assembly that is so constructed that it is substantially impossible for poultry to roost thereon.

Another object of the invention is to provide a nest assembly in which nests thereof are readily cleaned.

Another important object is to provide a nest assembly in which the complete assembly is rotated to an inverted position for dumping straw and litter from the nests to facilitate cleaning.

A further object of the invention is to provide an improved nest assembly in which all parts are made of metal so that the assembly may be cleaned by a hose.

A still further object is to provide an improved nest assembly upon which it is substantially impossible for poultry to roost in which the assembly is of simple and economical construction.

With these and other objects and advantages in view the invention embodies an elongated tray, box-like in cross section, pivotally mounted by a shaft in inverted V-shaped end frames, a longitudinally disposed vertically positioned center wall extended upwardly from the platform, spaced transversely positioned wire mesh partitions extended from the center wall, a spinner rotatably mounted above the center wall, spaced pins extended upwardly from side walls of the box-like section, perch bars extended from sides of the tray or platform, and a latch for retaining the platform in a horizontal position.

Other features and advantages of the invention will appear from the following description taken in connection with the drawings, wherein:

Figure 1 is a perspective view illustrating the improved nest assembly, and showing the platform in an upright position.

Figure 2 is an end elevational view of the nest assembly showing the device with the platform in an inverted position whereby cleaning thereof is facilitated.

Figure 3 is a longitudinal section through the end of the nest assembly on which a latch is positioned showing the platform in an upright position, and with parts broken away.

While one embodiment of the invention is illustrated in the above-referred-to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a platform or base, numerals 14 and 16 end walls extended upwardly from the platform, numeral 18 side walls also extended upwardly from the platform, numeral 20 a center wall extended longitudinally of the platform, numeral 22 wire mesh partitions extended from the center wall, numeral 24 wire mesh end walls extended upwardly from the end walls 14 and 16, numeral 26 a spinner rotatably mounted in upper ends of posts 28 and 30 extended upwardly from the platform, numeral 32 perches supported by braces 34 and extended from sides of the platform, numeral 36 a shaft pivotally mounted in bearings 38 of inverted V-shaped supports having legs 40 and 42, and numeral 44 a latch for retaining the platform in an upright position.

The platform is rectangular-shaped in plan and the nests are formed by placing straw between the wire mesh partitions, and to clean the assembly it is only necessary to release the latch and turn the platform over to the position shown in Figure 2, in which position all straw and the like will drop from the nests.

The platform 12 is secured to the shaft 36 by clamps 46 and the ends of the shaft are rotatably secured in the end supports by the bearings 38, as shown in Figure 3. The bearing 38 at one end of the assembly is provided with a vertically disposed plate 48 which is provided with a notch 50 in the upper end, and a latch bar 52 pivotally mounted on the post 28 is positioned to drop into the notch 50, as shown in Figures 1 and 3, to hold the assembly in an upright position. To turn the assembly over it is only necessary to move the bar 52 out of the notch 50 whereby the platform is released.

The upper edges of the end walls 14 and 16 are reinforced by bars 54, and similar bars 56 and 58 extend from ends of the bars 54 to the posts 28 and 30, providing supporting means for the wire mesh of the end walls. The upper edges of the wire mesh partitions are provided with metal binding strips 60 which prevent fowl perching upon the upper edges of the partitions. Similar strips 62 are provided on upper edges of the side walls 18 and vertically disposed pins 64 extend upwardly from the strips. The perches 32 are spaced from the side walls 18, and the brackets or braces which support the perches are secured to the end walls 14 and 16, such as by welding.

The upper ends of the posts 28 and 30 are provided with openings 66 into which pins 68 which extend from ends of the spinner 26 extend so that the spinner is freely held, and rotates to prevent fowl roosting thereon.

The upper ends of the end supports or legs 40 and 42 thereof are secured together and to the bearings 38 by welding or other suitable means.

Operation

With the nest assembly positioned as shown in Figure 1, straw or other suitable material is placed in the openings between the wire mesh partitions and with the spinner above the nests and the pins on the opposite sides other poultry will not be inclined to roost around a hen on a nest. The inclined binding strips on upper edges of the partitions also prevent roosting at the sides of the nests.

The complete nest assembly is readily cleaned by lifting the latch bar and turning the complete assembly over so that all straw and other material is deposited upon the ground, or into a suitable container for burning.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts, such as come within the purview of the invention claimed may be resorted to in actual practice, if desired.

Having now described the invention that which is claimed to be new and desired to be procured by Letters Patent, is:

1. A poultry nest assembly comprising a platform having a center wall and also side and end walls extended upwardly therefrom, spaced transversely disposed partitions extended between the center and side walls, upper edges of the partitions being inclined, a spinner rotatably mounted above the center wall, spaced pins extended upwardly from the side walls of the platform, a shaft secured to the lower surface of the platform, supports positioned at the ends of the platform, perches positioned on sides of the platform and suspended from the end walls thereof, bearings on the supports and in which ends of the shaft are rotatably mounted, and latch means for retaining the platform in an upright position.

2. In a poultry nest assembly, the combination which comprises a platform having a center wall and side and end walls extended upwardly therefrom, transversely disposed wire mesh partitions and end walls extended between the center and side walls defining nests, posts extended upwardly from ends of the platform and aligned with the center wall, a spinner positioned above the center wall and rotatably mounted in upper ends of the posts, perches extended from sides of the platform, a longitudinally disposed shaft secured to the under surface of the platform, supports at the ends of the platform in which ends of the shaft are rotatably mounted, and a latch at one end of the platform for retaining the platform in an upright position.

3. In a poultry nest assembly, the combination which comprises an elongated platform, a longitudinally disposed center wall extended upwardly from the center of the platform, side and end walls extended upwardly from the platform, wire mesh partitions with inclined upper edges extended between the center wall and side walls defining nests, perches supported by brackets extended from said end walls, supports positioned at the ends of the assembly, bearings on upper ends of the supports, a shaft secured to the under surface of the platform and positioned with ends thereof in the bearings on the upper ends of the supports, a latch for retaining the platform in a horizontally disposed position, a spinner positioned above the center wall of the platform, posts extended upwardly from ends of the platform and in which the spinner is rotatably mounted, and spaced pins extended upwardly from upper edges of the side walls of the platform.

References Cited in the file of this patent

UNITED STATES PATENTS

| | | |
|---|---|---|
| 307,502 | Streck | Nov. 4, 1884 |
| 1,010,213 | Anderson | Nov. 28, 1911 |
| 1,595,815 | Bergemann | Aug. 10, 1926 |
| 2,578,935 | Karstedt | Dec. 18, 1951 |
| 2,793,616 | Warner | May 28, 1957 |
| 2,827,014 | Kaegebin | Mar. 18, 1958 |